United States Patent [19]

Draskovich

[11] Patent Number: 5,006,423

[45] Date of Patent: Apr. 9, 1991

[54] ATTACHMENT OF INSTRUMENTATION TO CERAMIC COMPONENTS

[75] Inventor: Barry S. Draskovich, Mesa, Ariz.

[73] Assignee: Allied-Signal Inc., Phoenix, Ariz.

[21] Appl. No.: 186,275

[22] Filed: Apr. 26, 1988

[51] Int. Cl.$^5$ .................. B05D 3/02; C03B 29/00; C04B 35/56; C04B 37/02

[52] U.S. Cl. .................. 428/698; 427/376.2; 427/397.7; 427/397.8; 428/701; 501/88; 501/90; 156/281; 156/307.5; 156/325

[58] Field of Search ........... 428/446, 450, 698, 701; 156/89, 325, 281, 307.5, 325; 427/397.7, 397.8, 376.2; 501/88, 90, 21, 92; 29/621.1; 106/74, 89

[56] References Cited

U.S. PATENT DOCUMENTS

| | | | |
|---|---|---|---|
| 2,626,338 | 1/1953 | Mitchell | 201/63 |
| 3,245,018 | 4/1966 | Russell | 338/5 |
| 3,341,361 | 9/1967 | Gorski | 428/446 |
| 3,442,666 | 5/1969 | Berghazan | 106/39 |
| 3,745,502 | 7/1973 | Watanabe et al. | 338/3 |
| 3,805,377 | 4/1974 | Talmo et al. | 29/610 |
| 3,913,391 | 10/1975 | Kurtz | 73/88.5 R |
| 4,429,003 | 1/1984 | Fredriksson et al. | 428/446 |
| 4,659,411 | 4/1987 | Gindy et al. | 156/285 |

FOREIGN PATENT DOCUMENTS 1189601 1/1968 United Kingdom .

Primary Examiner—Paul J. Thibodeau
Assistant Examiner—Chris Brown
Attorney, Agent, or Firm—Robert A. Walsh; James W. McFarland

[57] ABSTRACT

A method of bonding metallic wires, such as strain gages, thermocouples, etc., directly onto ceramic components, such as silicon nitride or silicon carbide turbine parts, by means of a refractory cement formed from a mixture of water, sodium silicate, and a ceramic powder, preferably of a composition similar to the underlying ceramic component. Several thin layers of the mixture are applied and cured so as to provide a strong bond having good thermal shock resistance for testing at typical gas turbine operating temperatures, such as 2500° F. or above.

8 Claims, 1 Drawing Sheet

ATTACHMENT OF INSTRUMENTATION TO CERAMIC COMPONENTS

TECHNICAL FIELD

The present invention relates generally to measuring or testing and more particularly to methods of bonding sensors to ceramic specimens for high temperature testing.

BACKGROUND OF THE INVENTION

Sensors of the resistance wire or filament type have been in use for some time for measuring variable quantities such as temperature, stress, strain, torque, acceleration, pressure, etc. The sensors utilized may be of various configurations such as single elements (e.g., thermocouples) or multiple element, bridged configurations (e.g., strain gages) to provide a response proportional or related to the quantity to be measured. For example, a typical strain gage contains one or more metallic wires or filaments electrically connected in a conventional balanced bridge circuit. The force to be measured is mechanically coupled to the gage by various means, discussed below, so that the force exerted on the gage through the coupling means causes the dimensions of the wires to be altered, which results in a proportional change in the resistance of the wire. This in turn causes unbalancing of the bridge circuit by an amount at least roughly proportional to the force applied to the gage.

Many such sensors are used to monitor the temperatures and/or forces exerted upon mechanical components operating in difficult environments. As such, the sensors or gages are also exposed to the severe environmental conditions along with the high forces to be measured. While the advance of technology has improved the sensors themselves, as regards to their accuracy, reliability, etc., the attachment and coupling of these sensors to the components remains a weak link in the measurement process. It should be apparent that the sensors must not only be firmly attached so as to resist injury by the operating conditions but also firmly mechanically coupled to the component so as to efficiently transfer the temperature or forces acting thereon to the gage for accurate measurement.

The prior art has envisioned and implemented several different methods for mounting sensors to mechanical components operating in moderate to severe environments but each method has certain limitations.

For example, it is known to fabricate a sensor on a thin metallic support which is then mechanically locked to the component by pins, rivets, or even welding. See U.S. Pat. No. 3,245,018. Such methods are generally not useful for attachment to non-metallic ceramic materials.

It is also generally known to bond the sensors directly to the component by means of simple glues, cements, or similar adhesives. See, for example, U.S. Pat. No. 3,745,502. Epoxy glues are typically used since they have relatively good bonding characteristics and do permit fairly good force or strain transmission to the sensor. However, depending on the environment in which the sensor is operating, epoxy bonding is limited to testing or operating at temperatures below about 500° or 600° F.

Other bonding techniques, such as using glass or refractory cements, have been tried with limited success up to about 1000° F. See, for example, U.S. Pat. Nos. 3,805,377 and 3,913,391. However, all such techniques have serious disadvantages when attempts are made to extend their use into more exotic fields.

One commercially important field in which the present designs or applications of sensors are becoming inadequate to perform desired measurements is in the development and testing of high temperature non-metallic materials for gas turbine engines. Although the technology base of these materials (which include monolithic ceramics, ceramic or glass matrix composites, and carbon-carbon composites) has grown significantly in the last decade, further testing of full-scale components, sub-elements, and specimens with strain gages and thermocouples is required to better characterize the thermomechanical response of these materials under typical operating conditions.

Advanced gas turbine engines contemplate complex components operating at temperatures much higher than any other type of machinery, often to several thousand degrees. Therefore, in order to reliably model, test, and integrate new materials into advanced turbines, improved methods of instrumentation attachment are required.

It is therefore an object of the present invention to provide a new and improved method and apparatus for attaching instrumentation to non-metallic components for measuring or testing such under adverse conditions.

Another object of the invention is to provide a relatively simple and easy method of firmly attaching instrumentation to ceramic components of any desired size or shape.

A further object of the invention is to provide improved methods and procedures for the manufacture, installation and operation of instrumentation at very high temperatures.

SUMMARY OF THE INVENTION

The present invention aims to overcome the disadvantages of the prior art as well as offer certain other advantages by providing a novel refractory cement to bond metallic instrumentation to non-metallic components for use at temperatures up to about 2500° F. or more.

The refractory cement is formed from a mixture of sodium silicate in water (i.e., water glass) and a ceramic powder, preferably of a composition similar to the underlying ceramic component.

Generally, the instrumentation or sensors may be thermocouples, strain gages, or other similar resistance wires arranged for connection to a suitable electrical measuring network. The non-metallic components may be sintered or hot pressed silicon carbide, silicon nitride, and other similar silica-containing, monolithic ceramics or ceramic coated carbon-carbon and glass matrix composites.

Both the instrumentation and the component are cleaned and coated with the refractory cement mixture which is subsequently cured at about 200° F. The instrumentation is then positioned in the desired location on the component and covered with one or more thin layers of the mixture: curing each layer for 10 to 15 minutes. The completed assembly is then ready for high temperature exposure.

Broadly, the invention provides improved sensors which are attachable to the test component in such a fashion that strain-responsive coupling is obtained over the entire effective length of the wire contained within the sensor while overcoming the principal disadvantages and limitations of the previously used epoxy bonded sensors. The sensors of the present invention have the additional advantage of being equally well adapted for use under ordinary or ambient temperature conditions as well as extremely high temperatures. In addition, the sensors of the invention are easily applied to and well adapted for use with test specimens having curved or irregular surfaces.

BRIEF DESCRIPTION OF THE DRAWINGS

While this specification concludes with claims particularly pointing out and distinctly claiming the subject matter which is regarded as the invention, it is believed that the objects, features, and advantages thereof may be better understood from the following detailed description of a presently preferred embodiment when taken in connection with the accompanying drawings in which:

BEST MODE FOR CARRYING OUT THE INVENTION

Figure 1:
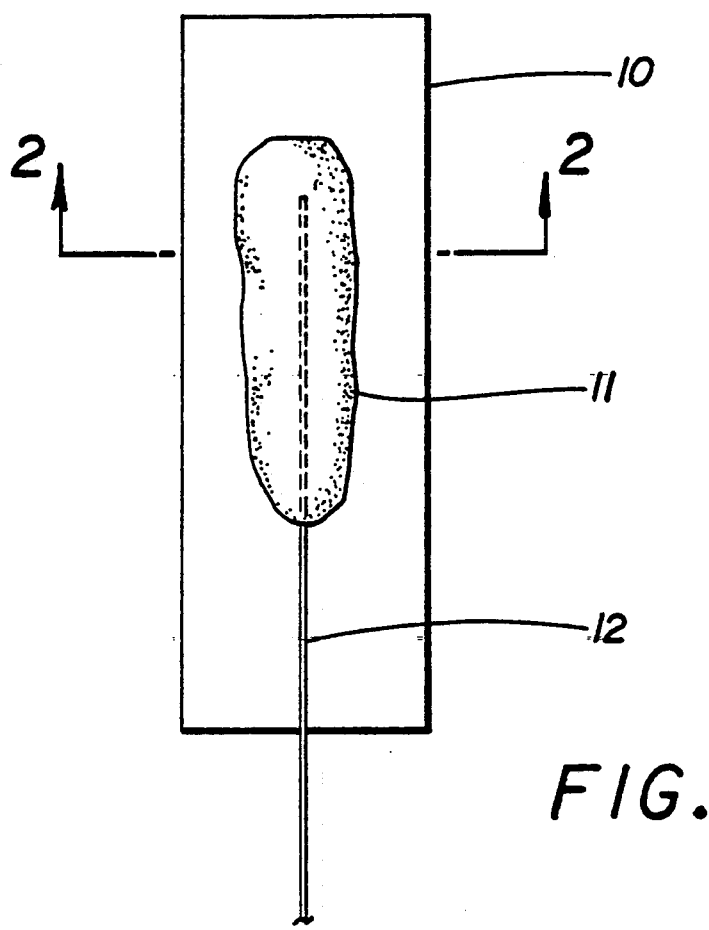
FIG. 1 is an illustration of a typical assembled sensor bonded to a ceramic test specimen.
Figure 2:
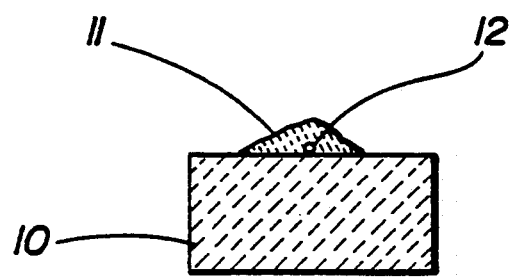
FIG. 2 is a cross-sectional view of the assembly along the lines A—A of FIG. 1.

The assembled sensor shown in FIG. 1 consists of a ceramic component or test specimen (10) to which is bonded a mass of refractory cement (11). Within the mass of cement (11) is one or more metallic wires (12) which function as a thermocouple or strain gage.

The composition of the ceramic in the tests described below was silicon carbide but any silica-forming material may be used including $SiO_2$, $Si_3N_4$, SiC composites, SiC coated carbon composite, etc. or most other high temperature materials having silicon in the surface layers.

The refractory cement (11) is prepared by thoroughly mixing equal parts, by weight, of a ceramic (silicon carbide) powder, preferably −325 mesh size, with sodium-silicate solution. The ceramic powder should be similar to the underlying component composition for best results. That is, substitute silicon nitride powder when bonding sensors to $Si_3N_4$ test specimens. However, since many $Si_3N_4$ components have a relatively high aluminum content from use of densification aids, alumina powder may also be used with acceptable results. The resulting alumino-silicate glass will bond to the alumina-containing, silica surface layer formed on the silicon nitride component.

The metallic wires (12) form the desired instrumentation, such as a thermocouple or a strain gage. Relatively large thermocouple wires may be slightly roughened with fine sandpaper to enhance mechanical bonding.

To bond the wires (12) to the ceramic component (10), each are cleaned, for example, with acetone or alcohol, and dried. A thin layer of the liquid refractory mixture (11) is then applied to each separately, lightly covering the areas to be bonded. The liquid mixture is cured or solidified by exposure to warm air (e.g., placed in a 200° F. oven) for a short time (e.g., about 5 minutes). After this base coat is cured, the instrumentation is positioned on the component and both completely covered with another thin layer of the liquid refractory mixture. If desired, the wires may be temporarily secured (e.g., taped) to the component at some point remote from the bond joint area to aid in proper positioning.

This bond layer is cured at about 200° F. for about 10 minutes. Preferably, a second layer of mixture is applied over the first and cured for about 15 minutes. The sensor is then complete and ready for high temperature exposure.

In order to verify the efficacy of this instrumentation attachment method, numerous laboratory evaluations were performed. These included temperature capability tests with small coupons and rig tests on full scale combustor components. All evaluations were successful and are briefly described below:

(1) A 20-mil, Inconel-sheathed, Type-K thermocouple was successfully bonded to a sintered, alpha silicon carbide test bar. A schematic of this arrangement is shown in FIG. 1. This specimen was continuously thermal cycled between room temperature and a high test temperature between about 1600° F. and 2200° F. No joint or thermocouple failure was observed indicating good thermal shock resistance of the bond material.

(2) Another specimen, of the same geometry, was used to measure temperature response. The bonded thermocouple replicated the output of a reference thermocouple, placed nearby, within 30° F. up to a temperature of 2200° F. This indicates good thermal response through the bond material.

(3) Both 10 and 20 mil strain gages were successfully attached to sintered alpha silicon carbide. The resistivity of the 20 mil gage remained stable up to at least 1600° F. (maximum test temperature). No failure indications were present, indicating good oxidation protection by the bond material.

(4) 18 Inconel-sheathed thermocouple joints were arranged at various locations on a 2.5 inch diameter sintered, alpha-silicon carbide disk. This disk was spun to 50,000 rpm. The outermost joints were thereby exposed to an acceleration force of 177,378 g's, with only one joint failure occurring, indicating good bond strength.

(5) Sintered alpha silicon carbide segmented combustor specimens were instrumented with thermocouples to show feasibility of this method on actual hardware. Thermal excursions to 2200° F. were successful.

(6) Type-K thermocouples were successfully attached to SiC/SiC composite test bars and completed thermal shock tests to 2200° F. without failure.

(7) SiC/SiC combustor rings have been fully instrumented with thermocouples using the described bonding method. The thermocouples were placed on the cold side of the rings and then oversprayed with heat sensitive paint (for temperature correlation). During subsequent combustor rig testing, the average burner outlet temperature reached 3500° F. while maximum cold side temperatures were monitored at 1100° F. Excellent bond adherence was observed throughout the test.

While in order to comply with the statute, this invention has been described in terms more or less specific to one preferred embodiment, it is expected that various alterations, modifications, or permutations thereof will be apparent to those skilled in the art. Therefore, it should be understood that the invention is not to be limited to the specific features shown or described but it is intended that all equivalents be embraced within the spirit and scope of the invention as defined by the appended claims.

What is claimed is:

1. A method of bonding metallic instrumentation to a silicon-containing ceramic, structural component composed of either silicon carbide, silicon dioxide, silicon nitride, silicon carbide composites, or silicon carbide coated carbon composites used in a gas turbine engine for high temperature testing comprising the steps of:

cleaning the instrumentation and the component in the area to be bonded, mixing a fine ceramic powder having a composition similar to that of said component with about an equal height of sodium silicate solution, applying a base coating of the mixture to the instrumentation and the component, and curing the base coating, positioning the instrumentation onto the component, covering the instrumentation with at least one layer of the mixture, and curing the mixture with heat to transform the sodium silicate solution into glass to bond the instrumentation to the ceramic component.

2. The method of claim 1 wherein the instrumentation is a thermocouple.

3. The method of claim 1 wherein the instrumentation is a strain gage.

4. The method of claim 1 wherein the ceramic component is sintered silicon carbide and the fine ceramic powder is −325 mesh size silicon carbide powder.

5. The method of claim 1 wherein the ceramic component is silicon nitride and the fine ceramic powder is selected from the group consisting of alumina, silicon nitride and mixtures thereof.

6. The method of claim 1 further including the step of subjecting the bond to temperatures above about 2000° F. without failure of the bond.

7. The method of claim 1 wherein the step of curing the mixture comprises heating the component and instrumentation to about 200° F. for about 5 minutes.

8. The method of claim 1 wherein the ceramic component is a silicon carbide coated composite material selected from the group consisting of carbon-carbon and glass matrix composites.

* * * * *